Aug. 30, 1949.　　　　　　J. M. TYRNER　　　　　　2,480,311
AUTOMATIC WELDING APPARATUS

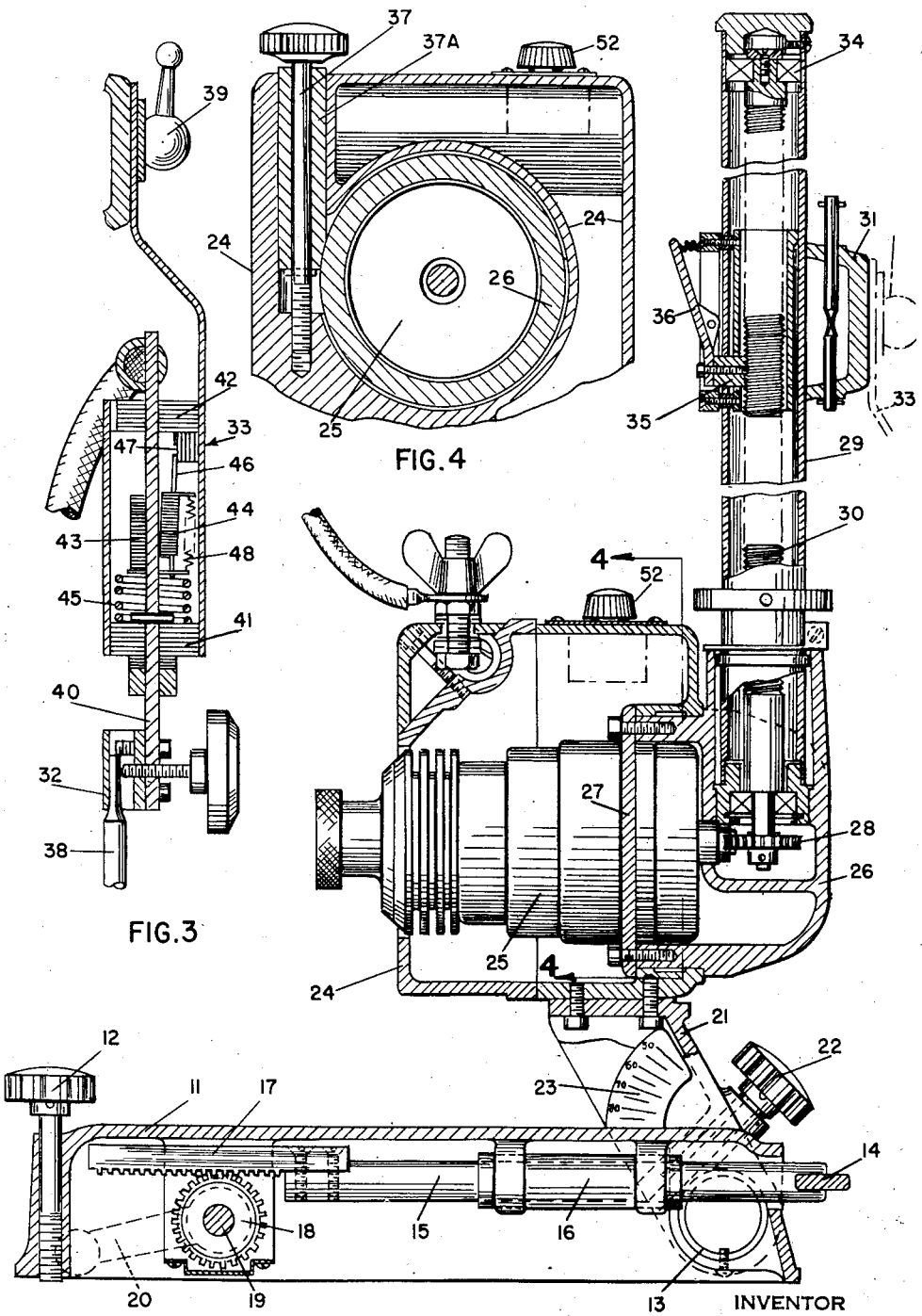

Filed July 17, 1948　　　　　　　　　　　　　　　3 Sheets-Sheet 3

INVENTOR
JOSEPH M. TYRNER
BY
ATTORNEYS

Patented Aug. 30, 1949

2,480,311

UNITED STATES PATENT OFFICE 2,480,311

AUTOMATIC WELDING APPARATUS

Joseph M. Tyrner, New York, N. Y., assignor to Air Reduction Company, Incorporated, a corporation of New York Application July 17, 1948, Serial No. 39,302

8 Claims. (Cl. 219—8)

This invention relates to apparatus for feeding and advancing an electrode or the like along a given path.

In general, the principal object of this invention is to provide such electrode feeding apparatus in a form that is relatively inexpensive, portable and simple to use and which produces consistently high quality results independent of the operator's skill.

As applied to electric arc welding, this invention makes it possible to perform many welding operations which heretofore could be performed only by manual operations. Heretofore a great variety of welding operations have been performed manually because of the great cost of automatic welding machines, automatic machines being feasible only in large shops where a great number of repetitive joints are to be made. Manual welding using a hand electrode holder, while versatile, depends very largely on the skill of the welder for its success.

One of the principal features of this invention involves a construction and arrangement of apparatus for feeding and advancing an electrode along a given path, so that the point of the electrode follows the desired straight path automatically, regardless of whether the path of the electrode feeding element follows a path parallel to the vertical plane through the path of the electrode, or a path inclined at an angle to this vertical plane.

Another feature of this invention comprises the combination of an electrode feed mechanism, including a feed screw electrically driven and controlled, and arranged to feed the electrode down any preselected inclined path to feed a consuming electrode and advance it along the desired path simultaneously.

Another feature of this invention comprises an improved welding circuit having an automatic control responsive to the electrical condition of the welding arc, typical embodiments of this control including either a speed governor that is operative only at a voltage in excess of the welding voltage, only at an arc voltage less than the normal welding voltage, or operative at the normal welding voltage, to control the feed of the electrode accordingly. My invention also contemplates the use of a welding circuit which will maintain a constant rate of electrode feed if such a constant rate of feed is desired by the operator for any purpose.

Other features of this invention include the provision of an adjustable guide bar for guiding the point of the electrode, with improved means for adjusting the position of this guide bar with respect to other parts of the apparatus, and the invention also includes an improved mounting for an electrode feed motor of such a nature that the motor and associated parts can be disposed at any predetermined angle.

The various objects and advantages of this invention will be more apparent upon considering the following detailed description of certain embodiments of the invention applied to electric arc welding machines as illustrated in the accompanying drawings, in which Fig. 1 is a perspective view of an arc welding machine embodying this invention, the machine being shown in operation;

Fig. 2 is a fragmentary sectional view of the apparatus shown in Fig. 1, with the arc starter and electrode holder removed;

Fig. 3 is a vertical sectional view of the arc-starter and electrode holder;

Fig. 4 is a transverse sectional view taken on line 4—4 of Fig. 2;

Figure 1:
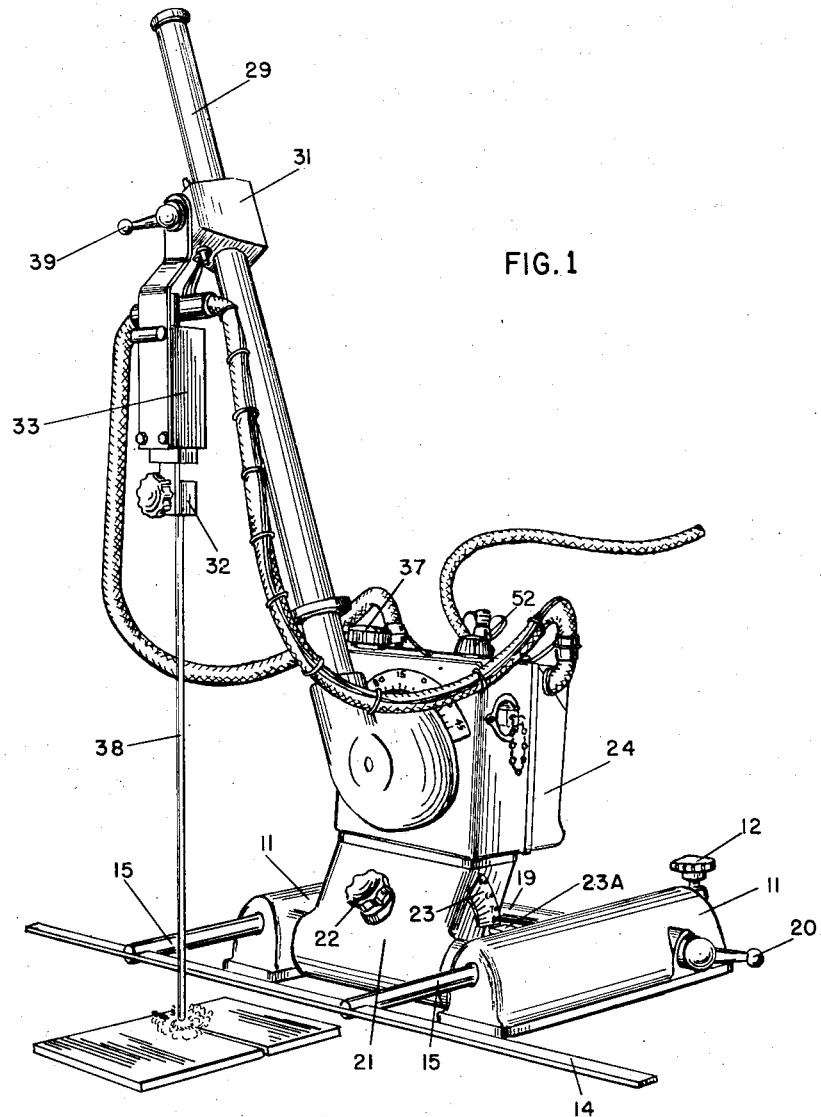

Referring to Figs. 1 and 2, the apparatus there illustrated comprises a double base 11 having tapped holes to receive a pair of levelling screws 12 for making the base stand solidly on an irregular surface. The two parts of the double base 11 are spaced from one another and interconnected by a tubular connecting member 13. An adjustable guide bar 14 is supported by a pair of rods 15 that slide in suitable non-conducting sleeves 16 in the base 11. Racks 17 attached to the backs of the rods 15 engage non-conducting pinions 18 mounted on a common shaft 19. Handles 20 secured to the shaft 19 permit adjustment of the guide bar 14 toward and away from the base. A bracket 21 is pivotally mounted on the tubular member 13 and may be locked in any angular position on this tubular member by tightening a lock screw 22 which serves to clamp the bracket to the tubular member. An indexed scale 23 indicates the angle of adjustment of the bracket 21 with respect to an indicator 23a on the base 11.

A housing 24 is mounted on the supporting bracket 21, this housing 24 enclosing a motor 25 fastened to a gear box 26 by a plate 27. This motor 25 drives a worm and worm wheel 28 through reduction gears interconnecting the motor and these gear elements. Attached to the gear box 26 is a tubular arm 29 through which a feed screw 30 extends from the worm wheel 28. A carriage 31 propelled by the screw 30 supports an electrode holder 32 and an arc starter 33 to move them along the tubular arm 29 at a rate determined by the speed of rotation of the motor 25. The feed screw runs in bearings 34 at the top of the tubular arm 30. The motor 25, gear box 26 and plate 27 are all rotatable in the housing 24 about the axis of the motor to change the inclination of the guiding arm 29.

A slot in the tubular arm 29 allows a ratchet type half nut 35 on the carriage to engage the feed screw 30. A release lever 36 is provided to disengage the half nut 35 from the feed screw so that this nut can be moved manually to any desired position along the screw. A clamping screw 37 (Fig. 4) surrounded by an annular sleeve 37a is threaded into the housing 24 and clamps the gear box 26 against rotation so that the tubular arm 29 is locked in the desired angular position. A welding electrode 38 is held by the electrode holder 32. This construction allows the tubular arm 29 to assume any desired angular position, and allows the carriage 31 to feed down the tubular arm while the arm is in any position selected. The arc starter and electrode holder assembly is rotatably mounted on the carriage 31 and is maintained at the selected angle by tightening a lever nut 39. The arrangement of these parts is such that in any adjusted angular position of the guide arm 29, this arm is parallel to the plane defined by the electrode 38 and the seam to be welded, this seam being parallel to the guide bar 14. Thus the tip of the electrode will follow a seam parallel to the guide bar 14 regardless of whether the plane defined by the electrode and the seam is vertical or inclined at an angle to the vertical. The axis of the tubular member 13, on which the bracket 21 is pivotally mounted, is in close proximity to and parallel with the guide bar 14, and the axes of the guide arm 29 and the tubular member 13 substantially intersect, regardless of the adjusted angular position of the guide arm.

The arc starter 33 may be similar to that shown in the J. M. Tyrner Patent 2,442,832 and the operation is as follows. The electrode holder 32 is fastened to a bus bar 40, which is free to move axially in two guides 41 and 42. The bus bar 40 is encompassed by two iron cores 43 and 44. The iron core 43 is rigidly connected to the bus bar, but the core 44 is pivoted at its lower end. When the bus bar is pulled down against a spring 45, a pin 46 extending from the upper end of the core 44, falls into a groove 47 because a spring 48 pulls the upper end of the core 44 away from the core 43. That keeps the electrode in the lower or cocked position. When the welding current is made to flow through the bus bar 40, the magnetic field around the bar pulls the two cores 43 and 44 together, and dislodges the pin 46 from the groove 47. The bus bar is then freed from its restraint and is pushed up by the spring 45. This action is used to withdraw the electrode from the work to establish the welding arc.

Figure 5:
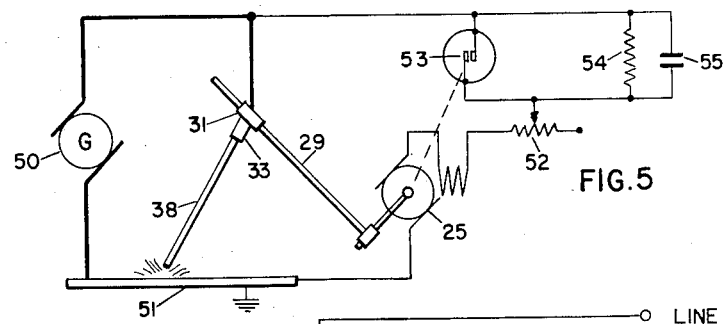
Fig. 5 is a diagrammatic illustration of the welding apparatus of Figs. 1-4, inclusive, and including the welding and control circuits.

The electrical connections of this welding machine are schematically illustrated in Fig. 5 in which one side of a welding generator 50 is connected to the work piece 51 and the other side is connected to the welding machine. The motor 25 is shown driving the feed screw in the arm 29 to propel the carriage 31. The electrode 38 is held by an electrode holder connected to the movable bus bar of the arc starter 33. In parallel with the arc is the motor circuit comprising the motor 25, a current limiting rheostat 52, and a parallel combination of centrifugal governor contacts 53, a resistor 54 and a capacitor 55. The motor 25 is preferably a series motor which will operate at a speed proportional to the impressed voltage on A. C. or D. C.

The operation of the machine is as follows. The tubular arm 29 is set to some preselected angular position, such as shown in Fig. 1, and the electrode 38 is placed in the electrode holder so that it rests against the guide bar 14 which is positioned above and just behind the weld line. The arc starter is pulled down into the "cocked" position. As soon as the welding generator 50 is started, full open circuit voltage appears across the motor circuit. The centrifugal governor contacts are closed allowing current to flow through them, through the rheostat 52 and the motor 25. The motor accelerates rapidly feeding the carriage down the tubular arm. Upon reaching a predetermined speed the centrifugal governor contacts open introducing the resistance 54 into the motor circuit slowing the motor down. The capacitor 55 minimizes arcing at the governor contacts. The governed motor then feeds the carriage down the inclined tube at constant speed until the electrode strikes the work piece 51.

At this point current flows in the welding circuit, which trips the arc starter and draws the welding arc. This reduces the voltage across the motor circuit; hence the motor speed is lowered and this causes the motor governor contacts to close and remain closed. The motor speed is now determined by arc voltage entirely and never becomes great enough to open the contacts 53. As the electrode burns off the carriage feeds down to maintain the arc length constant. Due to the angle of inclination of the tubular arm 29, for every vertical component of motion to keep the arc length constant there is a horizontal component of motion to lay down the bead.

Figure 6:
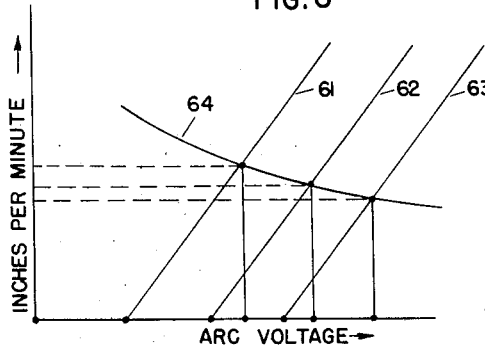
Fig. 6 is a graph showing carriage speed and electrode burn-off rate plotted against arc voltage.

For each setting of the rheostat 52, there is a different rate of carriage travel for each value of arc voltage. Carriage speed may be plotted against arc voltage for three settings of the control rheostat as curves 61, 62 and 63 of Fig. 6. Also plotted on the same figure is the burn-off rate for a given electrode for each value of arc voltage. This is curve 64. The intersection of the burn-off rate curve 64 with the carriage speed curve for any control rheostat setting represents the operating point of the welder for that setting.

The rate of deposit is affected by the angle formed by the electrode and the line of the bead, and by the angle between the line of the bead and the path of the carriage.

Figure 7:
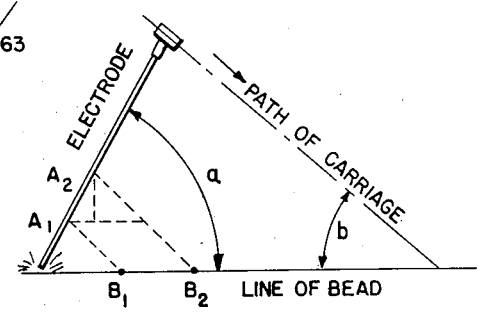
Fig. 7 is a diagrammatic illustration of the angular relation between the electrode and the work and the path of the carriage.

Referring to Fig. 7, $a$ represents the angle between the electrode and the line of the bead, and $b$ represents the angle between the line of the bead and the path of the carriage. Any two points, for example $A_1$ and $A_2$, will follow paths along the dotted lines parallel to the carriage path, and the portion of the electrode between $A_1$ and $A_2$ will be deposited between $B_1$ and $B_2$. Therefore the ratio of $B_1B_2$ to $A_1A_2$ indicates the length of bead deposited per unit length of electrode.

$$B_1B_2 = A_1A_2 \cos a + \frac{A_1A_2 \sin a}{\tan b}$$

$$B_1B_2 = A_1A_2 \left( \cos a + \frac{\sin a}{\tan b} \right)$$

$$B_1B_2 = A_1A_2\left(\frac{\cos a \sin b + \sin a \cos b}{\sin b}\right)$$

$$B_1B_2 = A_1A_2\left(\frac{\sin(a+b)}{\sin b}\right)$$

$$\frac{B_1B_2}{A_1A_2} = \text{deposit ratio} = \frac{\sin(a+b)}{\sin b}$$

Generally, the angle $a$ of the electrode and the deposit ratio are decided by the desired welding condition. That determines the angle $b$ which can be computed or found graphically.

The apparatus here described provides an automatic welding machine that is simple and can produce a weld of predetermined quality which is independent of the operator's skill. As the feed motor operates on arc voltage the feed adjusts itself to irregularities in burn-off of the electrode.

Figure 8:
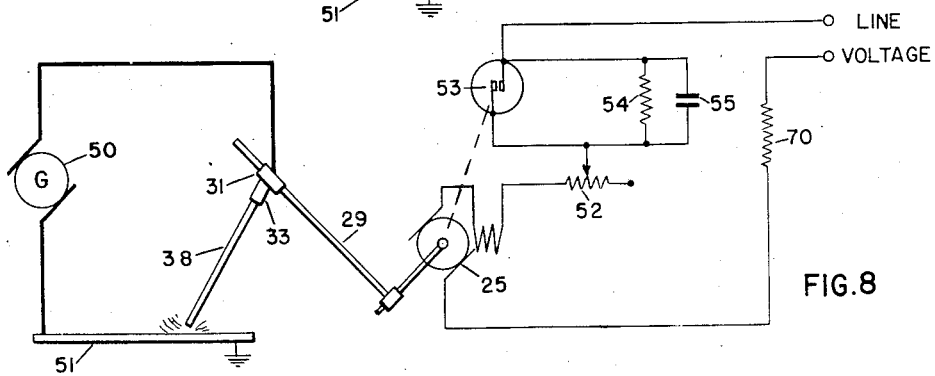
Fig. 8 is a diagrammatic illustration similar to Fig. 5 but showing a modified circuit arrangement for operating the feed motor at constant speed.

If desired, the drive of the apparatus may be controlled so that the motor runs with constant speed independent of the arc voltage. This arrangement is shown in Fig. 8 and is the same as the arc voltage connection of Fig. 5 with the exception that the motor is supplied from an independent voltage source through a fixed resistor 70 instead of from the welding generator. In this case the centrifugal governor 53 is used to set the speed of the drive. This type of operation is only suitable for welding with electrodes which have a very uniform burn-off rate and which do not change their characteristics while they are being consumed. This constant speed feed has been found particularly useful in laboratory investigation of electrode characteristics, as it exaggerates any change in welding characteristics in the course of consuming an electrode and eliminates the human element.

With controlled arc length, the apparatus can be used to determine burn-off rates. The fact that the deposit per inch of electrode is constant during the operation makes data obtained this way more dependable.

Figure 9:
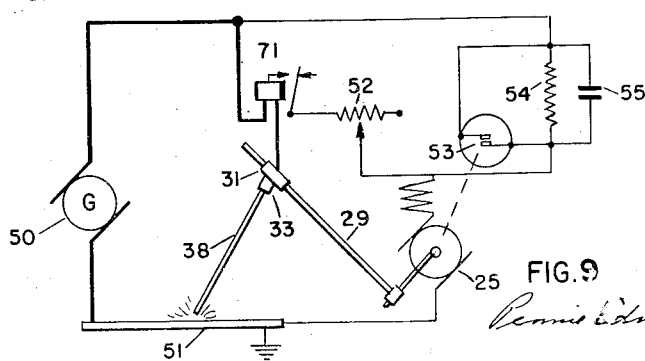
Fig. 9 is a diagrammatic illustration similar to Figs. 5 and 8 but illustrating another modification of the circuit arrangement for controlling the feed motor in response to arc voltage.

An alternate electrical circuit for use on arc voltage is schematically illustrated in Fig. 9. In this modification, a relay 71 is put in series with the welding electrode. The contacts of this relay are normally open. The control rheostat 52 is interposed between the relay 71 and the feed motor 25. The centrifugal governor circuit is in parallel with the relay 71 and rheostat 52. Upon starting the welding generator 50 the drive motor 25 feeds the carriage down the inclined tube at a rate determined by the centrifugal governor the same as in the circuit of Fig. 5. As soon as the electrode touches the work piece, current flows in the welding circuit which includes the relay 71. The arc starter then trips, establishing the arc, at the same time the relay contacts close placing the control rheostat 52 across the governor circuit. The resistance of the rheostat 52 is considerably less than the resistance 54 in the governor circuit, hence the motor speed is determined by the rheostat setting while running on arc voltage. With this electrical circuit the feed motor always runs fast enough during welding to hold the governor contacts open. It is this feature that differs from the modification shown in Fig. 5 where the governor contacts remained closed during welding.

As explained above, the construction and arrangement of the apparatus is such that the point of the electrode follows the desired path regardless of whether the path of the electrode feeding element follows a path parallel to the vertical plane through the path of the electrode, or follows a path inclined at an angle to this plane. The tubular arm 29 can be adjusted to any desired angular position about pivot axes at right angles to each other. The apparatus includes an electric motor for driving the support for the electrode holder through a power transmission directly interconnecting the motor and the support for the electrode holder. The motor and the tubular member 29 are so interconnected that they may be moved as a unit about the pivot axis, i. e. the axis of the tubular connecting member 13, and it will be understood that the tubular member 29 may be moved to any desired angular position about the axis of the motor 25, which axis is at right angles to that of the tubular member 13.

The control for the motor 25 comprises circuit connections connecting the source of welding current to the welding electrode and to the motor with means responsive to the speed of the motor for controlling the current supplied to the motor. In the control circuit as illustrated in Fig. 5 the current supplied to the motor 25 is controlled in such a manner that high speed operation of the motor obtains when the voltage of the source exceeds the normal welding voltage. Thus in this arrangement the movement of the welding electrode is more rapid prior to initiating the arc than it is after the arc is struck. In the arrangement of Fig. 8 the governor provides substantially constant speed drive at all times and in the arrangement of Fig. 9 the motor operates at higher speed during the welding operation than it does prior to the initiation of the welding operation.

It will be understood that my invention is not limited to the specific illustrative embodiments thereof described in the accompanying drawings but includes such modifications thereof as fall within the scope of the appended claims.

I claim:

1. In a machine for feeding and advancing an electrode toward and along a given line, the combination of an electrode holder for supporting the electrode, a movable carriage on which said holder is supported, a guide engaging said carriage for defining the path of movement thereof, means for moving the carriage along the guide to advance the electrode, and adjustable pivot means for supporting the guide so that it can be adjusted to any one of a plurality of laterally inclined positions about the pivot axis, said means for moving the carriage along the guide comprising an electric motor, a power transmission shaft extending along the guide and operatively connecting the motor and the movable carriage, the motor and the guide and the power transmission shaft being mounted to move as a unit about said pivot axis.

2. In a machine for feeding and advancing an electrode toward and along a given line, the combination of an electrode holder for supporting the electrode, a movable carriage on which said holder is supported, a guide engaging said carriage for defining the path of movement thereof, means for moving the carriage along the guide to advance the electrode including an electric motor, the guide extending substantially at right angles to the axis of the motor and being mounted for movement about the motor axis whereby the angularity between the guide and said line along which the electrode is to be advanced can be adjusted, and said means for moving the carriage along the guide also including a power transmission shaft extending along the guide and operatively connecting the motor and the movable carriage on the guide.

3. In a machine for feeding and advancing an electrode toward and along a given line, the combination of an electrode holder for supporting the electrode, a movable carriage on which said holder is supported, a guide engaging said carriage for defining the path of movement thereof, means for moving the carriage along the guide to advance the electrode including an electric motor, the guide extending substantially at right angles to the axis of the motor and being mounted for movement about the motor axis whereby the angularity between the guide and said line along which the electrode is to be advanced can be adjusted, said means for moving the carriage along the guide also including a power transmission shaft extending along the guide and operatively connecting the motor and the movable carriage on the guide, and means mounting the motor and the guide for movement as a unit about an axis at right angles to the motor axis so that the guide can be adjusted to any one of a plurality of laterally inclined positions.

4. In a machine for feeding and advancing an electrode toward and along a given line, the combination of a base, a motor support mounted on the base, an electric motor carried by said support, a tubular arm also carried by said support and extending substantially at right angles to the axis of the motor, a carriage movable on and guided by said tubular arm, an electrode holder supported by the carriage, and a power transmission shaft within the tubular arm and operatively connecting the motor and the carriage, the tubular arm being mounted for movement about the axis of the motor whereby the angularity between the arm and said line along which the electrode is to be advanced can be adjusted, and said motor support being movable relative to said base about an axis at right angles to the motor axis whereby the motor and the tubular arm can be moved as a unit about such axis so that the tubular arm can be adjusted to any one of a plurality of laterally inclined positions.

5. In a machine for feeding and advancing an electrode toward and along a given line, the combination of an electrode holder for supporting the electrode, a movable carriage on which said holder is supported, a guide engaging said carriage for defining the path of movement thereof, means for moving the carriage along the guide to advance the electrode including an electric motor, the guide extending substantially at right angles to the axis of the motor and being mounted for movement about the motor axis whereby the angularity between the guide and said line along which the electrode is to be advanced can be adjusted, said means for moving the carriage along the guide also including a screw shaft extending along said guide, gearing for driving said shaft from the electric motor, a ratchet type half nut mounted on the carriage and normally in operative engagement with said screw shaft, and manually operable means on the carriage for moving the half nut out of operative engagement with the screw shaft whereby the carriage may be moved along the guide by hand independently of the screw shaft.

6. In a machine for feeding and advancing an electrode toward and along a given line, the combination of an electrode holder for supporting the electrode, a movable carriage on which said holder is supported, a guide engaging said carriage for defining the path of movement thereof, said guide being movable about an axis such that the angularity between the guide and said line along which the electrode is to be advanced can be adjusted, a source of welding current, circuit connections connecting said source and the work and the electrode in a welding circuit, means for moving the carriage along the guide to advance the electrode comprising an electric motor adapted to operate at a speed proportional to the impressed voltage, driving connections between the motor and the carriage, the electric motor being electrically connected to the source of welding current in parallel with the arc, a centrifugal speed governor operated by the motor causing the motor to rotate at a predetermined substantially constant speed during that portion of the movement of the carriage along the guide which moves the electrode into contact with the work whereby the electrode is moved toward the work at a predetermined substantially constant speed until the arc is established, and means operating after the electrode contacts with the work for retracting the electrode to establish the arc, the electric motor then being run on arc voltage and its speed varying with the arc voltage to maintain the arc length substantially constant.

7. In an arc welding machine, the combination of a movable electrode holder for supporting the electrode, means for guiding the electrode holder so that the electrode has a component of movement toward the work, a source of welding current, circuit connections connecting said source and the work and the electrode in a welding circuit, means for moving the electrode holder to advance the electrode toward the work comprising an electric motor adapted to operate at a speed proportional to the impressed voltage, driving connections between the motor and the electrode holder, the electric motor being electrically connected to the source of welding current in parallel with the arc, a centrifugal speed governor operated by the motor causing the motor to rotate at a predetermined substantially constant speed during movement of the electrode into contact with the work whereby the electrode is moved toward the work at a predetermined substantially constant speed until the arc is established, and means operating after the electrode contacts with the work for retracting the electrode to establish the arc, the electric motor then being run on arc voltage and its speed varying with the arc voltage to maintain the arc length substantially constant.

8. In an arc welding machine, the combination as set forth in claim 7 having an adjustable rheostat connected in series with the electric motor for the purpose described.

JOSEPH M. TYRNER.

REFERENCES CITED

The following references are of record in the file of this patent:

UNITED STATES PATENTS

| Number | Name | Date |
|---|---|---|
| 2,269,484 | Ronay | Jan. 13, 1942 |
| 2,274,742 | Ronay | Mar. 3, 1942 |
| 2,422,811 | Tyrner | June 24, 1947 |